Patented Oct. 28, 1952

2,615,851

UNITED STATES PATENT OFFICE 2,615,851

BITUMINOUS EMULSIONS

Donald N. Manzer, Walnut Creek, Calif., assignor, by mesne assignments, to American Bitumuls & Asphalt Company, San Francisco, Calif., a corporation of Delaware No Drawing. Application August 21, 1951, Serial No. 242,989

10 Claims. (Cl. 252—311.5)

The present invention relates to bituminous emulsions. More particularly, the invention relates to the preparation of bituminous emulsions characterized by superior adhesion for various kinds of surfaces or objects coated therewith and the composition comprising material coated with or by means of such bituminous emulsions.

This application is a continuation-in-part of my copending application filed April 19, 1949, Serial No. 88,479, now abandoned.

When employing a bituminous emulsion, for example an asphaltic emulsion, as a protective or binding material, as in road construction, a constant object sought in the art is the improvement of the bond between the bitumen of the emulsion and the material to be protected therewith or bound thereto. For example, in the art of constructing and repairing the surfaces of roads, highways, bridges and the like, it is desirable that the bitumen have a strong affinity for, and strongly adhere to, mineral aggregate. It is further desired that the bituminous substance coat the individual particles of aggregate thoroughly, uniformly and lastingly, and that the bond between the aggregate and the bituminous substance remain unimpaired regardless of weather and condition or type of aggregate.

For example, in the coating of paving aggregate with a bituminous substance the bond or the adhesion between bitumen and aggregate in the presence of water, water vapor and telluric moisture is insecure and weak. As a result of the poor adherence or bond between the aggregate and bitumen, the road breaks down in a comparatively short while, thus increasing maintenance costs.

The problem of satisfactorily coating aggregate is particularly troublesome when the aggregate is of a hydrophilic nature. Such an aggregate has greater affinity for water than for the asphalt, as a result of which water is preferentially adsorbed by the aggregate, thus displacing the bitumen and causing the breakdown of the composition. For this reason, locally occurring aggregates of a hydrophilic nature often cannot be employed, and suitable aggregate far removed from the site of construction is required to be transported to where needed, which procedure adds to the cost of construction.

A principal object of the invention, therefore, is to provide a bituminous emulsion, such as an asphaltic emulsion, capable of adhering more tenaciously to mineral aggregate; of exhibiting a stronger bond or superior adhesiveness for mineral aggregate, in spite of the deteriorating effects of the presence of water; and of being satisfactorily used with hydrophilic aggregate.

Another object of the invention is to provide bituminous emulsions not only characterized by superior adhesion properties but also by good dehydration and mixing ability, as hereinafter more fully pointed out.

Briefly, the invention contemplates the bringing together of bituminous emulsion and aggregate in the presence of an adhesion-promoting salt or mixture of such salts selected from the group consisting of ammonium sulfate, ferrous ammonium sulfate, ammonium nitrate, ammonium chloride, ammonium thiocyanate, ammonium sulfamate, and ammonium molybdate, the said salt or salts being present in an amount sufficient to impart the improved properties hereinabove described to bitumen-aggregate mixtures. As hereinafter shown, the adhesion-promoting salt material may be added to the bituminous emulsion or to the aggregate, or to both. Preferably, however, the ammonium salt material is incorporated in the bituminous emulsion.

Also in accordance with the invention, it has been discovered that the aforesaid salts are effective with slow-setting bituminous emulsions of the oil-in-water type having an aqueous phase of relatively high alkalinity. Slow-setting bituminous emulsions, prepared in accordance with the methods hereinbelow described, ordinarily have a pH of about 11.5 and higher, as determined by a glass electrode pH meter. These emulsions treated with the salts of the present invention have greatly improved adhesion characteristics, while bituminous emulsions of relatively low alkalinity are not improved to the same extent. Thus, for best results it is preferred to treat emulsions which are highly alkaline, that is, those emulsions having a pH of about 11.5 and higher, and not lower than about 9, and preferably not lower than about 10. The salts of the present invention have been found to be most effective when employed in combination with slow-setting oil-in-water bituminous emulsions having a pH within the range of about 9, preferably 9.5–10, to about 11.5 and higher.

It has been found that the foregoing ammonium salts give unpredictable and superior results when incorporated in bituminous emulsions of the oil-in-water type, and that not all ammonium salts are effective in producing the desired results. For example, such ammonium salts as those derived from acids of phosphorus are ineffective to produce the desired degree of adhesiveness necessary to meet specifications, as will hereinbelow appear. Other ammonium salts, such as ammonium borate, ammonium bifluoride and ammonium carbonate, yield even poorer results. Of all the salts tested for suitability, only those specifically enumerated above, so far as is known, may satisfactorily be used.

I am aware of the fact that certain salts have heretofore been proposed as adhesion-promoting agents. For example, U. S. Patent No. 2,412,526 to Paul E. McCoy discloses the incorporation into bituminous emulsions of an alkali metal dichromate, particularly sodium and potassium dichromate, and including ammonium and lithium dichromate. It is believed these salts owe their effectiveness to the acid portion, or the dichromate anion, of the salt molecule. With the salts of the present invention, it is not known what agent or factor is responsible in producing the desired results. Thus, such alkali metal salts as sodium sulfate, sodium chloride, sodium nitrate, etc., are ineffective to promote adhesion, indicating that the effectiveness of the salt material is not due to the anionic portion of the molecule. Likewise, the cationic ammonium radical is not solely the responsible agent in producing the desired results, for most ammonium salts, such as those derived from the acids of phosphorus, boron, carbonic, hydrofluoric, etc., are ineffective for purposes of the present invention. It is believed, however, that in order to achieve the desired effects the combination of the ammonium radical and a particular anion is necessary, the suitability of any unproven anion as hereinabove indicated being unpredictable.

The salts of the present invention have been found to be particularly useful when incorporated in stable or mixing type bituminous emulsions, which emulsions ordinarily contain a stabilizing agent to render them stable against breakdown upon contact with electrolytes, mineral matter and the like. Suitable emulsions employed in accordance with the invention are, for example, those meeting specifications for slow-setting emulsions set out in ASTM designation: D 631–46. These emulsions owe their stability to a stabilizing organic colloid contained therein or are inherently stable by virtue of the emulsifying agent employed to effect emulsification.

A common expedient in preparing stable emulsions is the treatment of so-called primary or quick-breaking emulsions with stabilizing agents to convert the quick-breaking emulsion into the slow-setting type. As is well known in the art, quick-setting emulsions, that is, emulsions tending to break quickly upon contact with electrolytes, stone, or when applied to surfaces in the customary manner, may be prepared conveniently by the use of certain asphalts, such as California or Mexican asphalts. Such asphalts are treated with water-soluble alkaline materials which react with the naturally occuring acids, known as asphaltogenic acids, contained in the asphalts to produce the emulsifying agent or agents. Suitable processes employed in the preparation of such emulsions are described in Patent No. 1,643,675 to Montgomerie, and in Patent No. 1,737,491 to Braun.

Stabilization of the primary emulsion to convert the emulsion to the slow-setting type may then be effected by the incorporation in the primary emulsion of a wide number of stabilizing agents. For example, Buckley Patent No. 2,256,886 discloses the use of a petroleum-insoluble solvent-extracted resin from pine-wood this resin being more fully disclosed in U. S. Patent No. 2,114,393 to Lane, and U. S. Patent No. 2,193,026 to Lucius Coleman Hall. Further stabilizing agents which may suitably be employed in the stabilization of primary bituminous emulsions are such materials as blood, shown for example in the Claude L. McKesson Patent No. 2,074,731 and in the Walter D. Buckley et al. Patent No. 2,372,658; glycinin-containing material, as shown in Patent No. 2,336,468 to Walter C. Cole et al.; the lignin material disclosed in the copending application Serial No. 697,834 of Walter D. Buckley et al., now Patent No. 2,483,806 granted October 4, 1949.

Thus, a number of stable emulsions may satisfactorily be used in accordance with the present invention. To the extent pertinent, therefore, the disclosures appearing in the aforesaid patents and copending application relating to the nature and method of preparation of stable emulsions are incorporated in the present description of my invention and are accordingly made a part thereof. Such emulsions may be prepared from water-insoluble, water-dispersible, organic thermoplastic bituminous substances normally solid, semi-solid or viscous liquids at ordinary atmospheric temperatures. These materials are bitumens, such as petroleum and native asphalts, native mineral waxes, asphaltites; pyrobitumens, such as asphaltic pyrobituminous shales, lignite, peat; pyrogenous distillates, such as petroleum paraffin, peat paraffin, oil-gas tar, coal tar; pyrogenous residues, such as blown petroleum asphalts, sludge asphalts, pressure tars, residual oils; oil-gas-tar pitch, wood pitch, etc. Of these materials, petroleum asphalt is most advantageously used, and it may be produced by steam-refining, by air-blowing, by solvent extraction methods or by a combination of such methods.

In accordance with a preferred embodiment of the invention, the adhesion-promoting salt is incorporated into a stable emulsion after the emulsion has been formed. The salt may be added in crystal form, but preferably is added to the preformed emulsion in solution form, a 5–50 per cent water solution of the salt being satisfactory. In order to prevent local overconcentrations of the salt in the emulsion, the salt is added thereto with vigorous agitation.

Alternatively, the salt may be incorporated in the emulsion, either in crystal or solution form, during the process of preparing the emulsion. For example, the salt may be incorporated into the emulsion by subjecting a mixture of the emulsion ingredients and the salt to conditions of emulsification, as by passing the mixture through a colloid mill.

The amount of salt to be incorporated in the emulsion sufficient to impart to the emulsion an improvement in adhesion meeting specifications ordinarily resides within the range of about 0.3 to 1 per cent by weight of the emulsion, for most purposes an amount of salt of about 0.5 per cent, and between about 0.5 to 1 per cent being satisfactory. In some instances, amounts as low as 0.1 per cent and lower may advantageously be employed. In general, it has been found that the stronger the alkalinity of the emulsion, the greater the concentration of salt required to produce the desired results.

In some instances it may be desirable to treat the aggregate with the salt. Aggregate may be mixed with the salt in crystal form or with a solution thereof, care being taken to provide for uniform distribution of the salt throughout the mass of aggregate, the amount of salt employed being similar to that given above based on the emulsion.

In order that stable bituminous emulsions fulfill their purpose efficiently, it is desirable that these emulsions have certain properties, such as good adhesion, high dehydration, and good mixing ability. Certain tests have accordingly been devised to evaluate these properties and to serve as criteria for the grading of the emulsions.

A useful test in measuring the ability of a bituminous substance to adhere firmly to aggregate, and the one employed in obtaining the adhesion data herein appearing, is as follows:

100 g. samples of Massachusetts rhyolite, graded so as to pass entirely through a ⅜-inch sieve and to be retained completely on a No. 10 sieve, are heated at 325° F. for 1 hour. To the heated samples there is then added 8 g. of the emulsion being tested. The rhyolite-emulsion samples are mixed for approximately 2 minutes under infrared light until all stone fragments are completely coated. After mixing, the samples are placed under infrared light at approximately 200° F. for 2 hours. At the end of this period each sample is remixed for 1 minute, and 50 g. of each is placed in 400 ml. of boiling distilled water and stirred with a glass rod for 1 minute at the rate of 60 r. p. m. of the rod. After stirring, water is drawn off the sample, which is then allowed to dry in air. When all the samples are dry, they are examined usually by experienced observers to determine the percentage of aggregate coated with asphalt (adhesion). According to this test, a satisfactory emulsion will give an adhesion of not less than about 75 per cent, and emulsions meeting specifications are ordinarily required to give such an adhesion value.

Stabilized slow-setting bituminous emulsions are often entirely satisfactory from the standpoint of stability against breakdown, as determined by standard cement mixing tests, but are unsatisfactory for certain uses because of objectionable drying rates. Such emulsions are characterized by a very slow dehydration rate, and when applied as a coating, or the like, form a film or skin on the surface in a manner such that proper drying of the underlying emulsion is inhibited or prevented. Although emulsions having this inferior drying property are useful, it is highly advantageous, and in some instances essential, that a bituminous emulsion be characterized not only by stability against breakdown but by the ability to give off a major portion of its contained water in a reasonably short time. A convenient dehydration test, and the one utilized for obtaining the data given in the present specification on drying rates, is as follows:

100 g. of the emulsion to be tested is placed in a tared Pyrex dish, 77 mm. in inside diameter and 40 mm. in height, having a flat bottom and straight sides. The dish is placed in the center of a shallow pan about 5 inches in diameter and 50 g. of granular anhydrous calcium chloride is spread in the pan so that it surrounds the dish containing the emulsion. The entire unit is then placed in a constant temperature oven set at 100° F. At the end of exactly 96 hours, during which time the sample is not disturbed by stirring or excess movement, the loss of weight of the emulsion is determined. The dehydration loss is expressed as the per cent of the loss of this test in 96 hours based on the loss in a test for residue at 163° C. as described in paragraph 15 of Tentative Methods, ASTM designation: D 244–36T. A satisfactory quick-drying emulsion will show a dehydration loss of about 60 per cent or more which indicates that the emulsion when applied will produce a film of coating which will set and dry uniformly without skinning over the surface.

Slow-setting or mixing-type bituminous emulsions which are employed for coating finely graded or dusty aggregates are required to have good mixing ability, as noted, for example, in the cement mixing test of ASTM designation: D 631–46. These emulsions are required to have stability against coalescence or premature breakdown when mixed with aggregate, stone or when brought in contact with aggregate, stone or electrolytes. This stability is measured by the cement mixing test described in ASTM designation: D 244–42 (Cement Mixing). The object of this test is the determination of the amount of coagulation resulting from mixing Portland cement with the emulsion. In carrying out the test, 50 g. of Portland cement passing through a No. 80 sieve is placed in a round-bottom iron dish. Then 100 ml. of the emulsion to be tested, diluted to a residue of 55 per cent as determined by either distillation or evaporation for 3 hours at 163° C., is poured on the cement and stirred with a ½-inch steel rod, making 60 complete revolutions during 1 minute. At the end of the 1-minute mixing period, 150 cc. of distilled water is added and stirring continued for 3 minutes. Ingredients and apparatus are maintained at a temperature of approximately 25° C. during mixing. The mixture is then poured through a tared No. 14 iron sieve and rinsed until the wash water is clear. Following the washing operation, the sieve is placed in a tared shallow pan, and heated at a temperature of 163° C. until dry, and then weighed. The weight in grams of the material retained on the screen and in the pan is the percentage emulsion broken. To pass the mixing test not more than 2 per cent should be broken.

To illustrate the practice of the invention, the following examples are given. It is not intended, however, to limit the invention to the examples, since many variations in the preparation and nature of the compositions falling within the scope of the invention will readily occur to those skilled in the art.

*Example 1*

A primary emulsion was prepared according to the process disclosed in Montgomerie U. S. Patent No. 1,643,675 by mixing melted California asphalt of 200–300 penetration with hot, dilute alkaline water. The resulting emulsion was stabilized by incorporating therein a mixture in water of caustic soda, the pinewood resin material disclosed in the Walter D. Buckley U. S. Patent No. 2,256,886 (hereinafter referred to as "pinewood resin"), and the purified lignin material disclosed in the copending application Serial No. 697,834 of Walter D. Buckley (hereinafter referred to as "purified lignin"). There was then added to the stabilized emulsion ammonium sulfate in a 20 per cent water solution. The finished emulsion contained the following proportions of the above-mentioned ingredients by weight per cent.

Ingredients:
- Primary emulsion _____ 94.950
- Purified lignin _____ .600
- Pinewood resin _____ .250
- Sodium hydroxide _____ .025
- Ammonium sulfate _____ .400
- Water _____ 3.775

100.000

The foregoing emulsion tested as follows:

| | |
|---|---|
| Residue | 56.6 |
| Viscosity, Saybolt furol, 60 ml. at 77° F. | 41.6 |
| Cement mixing | Pass |
| pH | 9.4 |
| Screen (20 mesh) | 0.025 |
| Dehydration | 0.892 |
| Adhesion _____Percent | 95 |
| Settlement, 5 days | +0.4 |

The residue viscosity, screen, and settlement tests above listed are standard tests, description of which may be obtained from ASTM designation: D 244–42 under the headings Distillation, Viscosity, Sieve Test and Settlement, respectively.

Other emulsions described in the following examples were prepared substantially as described in Example 1, that is, from a Montgomerie type primary emulsion subsequently stabilized with an aqueous mixture of pinewood resin, sodium hydroxide, and purified lignin. After formation of the stabilized emulsion, the indicated salt was added.

The examples that follow illustrate the adhesion-promoting effects imparted to emulsions by the incorporation of the salts herein contemplated. Example 7 represents a control emulsion to which no salt had been added. Into this emulsion there was incorporated instead boric acid to lower the pH of the emulsion and thus render it stable. As taught in the copending application of Walter D. Buckley, Serial No. 697,834, slow-setting emulsions containing purified lignin as a stabilizing agent have poor stability unless the pH of the emulsion is lowered. When using a salt of the type herein contemplated, no lowering of the pH is required other than that occurring through the use of the salt. Thus, the salts contemplated by the invention serve to impart superior adhesion characteristics to slow-setting emulsions generally and, in addition, to impart stability to slow-setting emulsions containing a purified lignin as the stabilizing agent.

It will be noted that the adhesion characteristics of the control emulsion of Example 7 were extremely poor.

The ingredients of the various emulsions and proportions thereof in per cent by weight of the finished emulsion were as follows:

| Ingredients | Examples | | | | | |
|---|---|---|---|---|---|---|
| | 2 | 3 | 4 | 5 | 6 | 7 |
| Primary emulsion | 92.700 | 92.700 | 92.700 | 92.700 | 92.700 | 92.700 |
| Purified lignin | 0.600 | 0.600 | 0.600 | 0.600 | 0.600 | 0.600 |
| Pinewood resin | 0.250 | 0.250 | 0.250 | 0.250 | 0.250 | 0.250 |
| Sodium hydroxide | 0.025 | 0.025 | 0.025 | 0.025 | 0.025 | 0.025 |
| Water | 2.425 | 2.425 | 2.425 | 2.425 | 2.425 | 2.425 |
| Salt, as 10% water solution: | | | | | | |
| Ammonium nitrate | 0.40 | | | | | |
| Ammonium thiocyanate | | 0.40 | | | | |
| Ammonium chloride | | | 0.40 | | | |
| Ferrous ammonium sulfate | | | | 0.40 | 0.40 | |
| Boric acid | | | | | | 0.30 |

As indicated by the following analyses, the foregoing emulsions, except the control emulsion of Example 7, were satisfactory in all respects, including adhesion. The emulsion of Example 7 gave an adhesion of only 5 percent, and was therefore unsatisfactory.

| | Examples | | | | | |
|---|---|---|---|---|---|---|
| | 2 | 3 | 4 | 5 | 6 | 7 |
| Residue | 56.8 | 56.4 | 58.0 | 56.4 | 58 | 58.2 |
| Viscosity (Saybolt Furol) | 172 | 122 | 79 | 63 | 74.8 | 32 |
| Cement test | Pass | Pass | Pass | Pass | Pass | Pass |
| Screen (20 mesh) | 0.010 | 0.025 | 0.030 | 0 | Trace | 0.020 |
| pH | 9.5 | 9.6 | 8.9 | 9.1 | 9.7 | 9.4 |
| Adhesion | 90 | 95 | 100 | 90 | 85 | 5 |
| Dehydration | 0.898 | 0.563 | 0.972 | 0.878 | 0.625 | 0.753 |
| Settlement, 5 days | +0.2 | +0.8 | +0.2 | +0.2 | +0.6 | +0.2 |

Several other salts were tested for suitability with particular reference to their ability to promote adhesion. The emulsions employed were substantially the same as those described in the examples. The salt ammonium borate was found to give an adhesion of 10 per cent; ammonium dihydrogen phosphate, 60 per cent; ammonium monohydrogen phosphate, 50 per cent; ammonium carbonate, 5 per cent. The salt ammonium bifluoride broke the emulsion, and gave only 50 per cent adhesion on the unbroken portion of the emulsion. Ammonium molybdate was found to be a borderline salt with an adhesion of 75 per cent.

*Example 8*

A stream of molten Texas asphalt (Coltex) was run into a colloid mill together with a second stream of water containing pinewood resin, potassium hydroxide and bentonite. After emulsification, there was added ammonium sulfate as a 20 per cent solution. The ingredients and proportions thereof in weight per cent were as follows:

Ingredients:      Per cent by weight
- Asphalt _____ 57.00
- Pinewood resin _____ 1.50
- Potassium hydroxide _____ 0.20
- Bentonite _____ 0.35
- Water _____ 40.95

Added:
- Ammonium sulfate _____ 0.40
- Water _____ 1.60

The foregoing emulsion analyzed as follows:

| | |
|---|---|
| Residue | 56.6 |
| Viscosity (Saybolt furol) | 32 |
| Cement test | Pass |
| Screen (20 mesh) | Trace |
| Dehydration | 0.817 |
| Adhesion | 95% |
| Settlement, 5 days | 0.8 |

Another emulsion was prepared employing a Mid-Continent asphalt of 180/200 penetration. The below-indicated ingredients in the indicated amounts were all charged simultaneously to a colloid mill.

*Example 9*

Ingredients:      Per cent by weight
- Asphalt _____ 62.00
- Pinewood resin _____ 0.25
- Purified lignin _____ 0.60
- Bentonite _____ 0.50
- Potassium hydroxide _____ 0.20
- Ammonium sulfate _____ 0.40
- Water _____ 36.05

The following analyses were obtained on the foregoing emulsion:

| | |
|---|---|
| Residue | 63.00 |
| Viscosity (Saybolt furol) | 126 |
| Cement test | Good |
| pH | 9.5 |
| Dehydration | 0.890 |
| Adhesion | 100 |
| Settlement, 5 days | +2.4 |

The emulsions of the present invention are particularly adapted for mixing with mineral aggregates in paving and other similar operations and compositions; for the stabilization of soil mixture useful as surfaces for airports, for making adobe bricks, for roads or in dam constructions and the like. They, moreover, exhibit superior adhesion properties, good dehydration properties and good mixing ability, while utilizing relatively inexpensive salt materials to give results heretofore incapable of achievement or achieved only through the use of expensive materials.

Obviously, many modifications and variations of the invention as hereinbefore set forth may be made without departing from the spirit and scope thereof, and therefore only such limitations are to be imposed as are indicated in the appended claims.

I claim:

1. A slow-setting oil-in-water type emulsion relatively stable against breakdown upon contact with electrolytes consisting essentially of water; a water-insoluble, water-dispersible, organic thermoplastic bituminous substance having been emulsified therein at a pH above about 9; and a small amount, sufficient substantially to promote adhesion of the emulsified bituminous substance, of salt material of the group consisting of ammonium sulfate, ferrous ammonium sulfate, ammonium nitrate, ammonium sulfamate, ammonium chloride, ammonium molybdate, ammonium thiocyanate, and mixtures thereof as the sole effectual agent in promoting said adhesion of the emulsified bituminous substance.

2. The emulsion of claim 1, wherein the bituminous substance is asphalt.

3. The emulsion of claim 2, wherein the salt material is ammonium sulfate.

4. The emulsion of claim 2, wherein the salt material is ammonium chloride.

5. The emulsion of claim 2, wherein the salt material is ammonium sulfamate.

6. The emulsion of claim 2, wherein the salt material is ammonium nitrate.

7. The emulsion of claim 2, wherein the salt material is ferrous ammonium sulfate.

8. The emulsion of claim 1, wherein the salt material is incorporated thereinto as an aqueous solution.

9. The emulsion of claim 1, wherein the salt material is present in an amount of about 0.3 per cent to about 1 per cent by weight of the emulsion.

10. The emulsion of claim 9, wherein the salt material is ammonium sulfate and the bituminous substance is asphalt.

DONALD N. MANZER.

REFERENCES CITED

The following references are of record in the file of this patent:

UNITED STATES PATENTS

| Number | Name | Date |
|---|---|---|
| 2,314,242 | Porter | Mar. 16, 1943 |
| 2,330,100 | Williams | Sept. 21, 1943 |
| 2,376,447 | Mullin | May 22, 1945 |
| 2,392,457 | Buckley et al. | Jan. 8, 1946 |
| 2,412,526 | McCoy | Dec. 10, 1946 |
| 2,481,374 | Watts et al. | Sept. 6, 1949 |

FOREIGN PATENTS

| Number | Country | Date |
|---|---|---|
| 417,776 | Canada | Jan. 18, 1944 |